Sept. 13, 1966     J. R. BENFORD     3,272,070

OPTICAL SYSTEM FOR STEREOMICROSCOPE

Filed Jan. 18, 1963

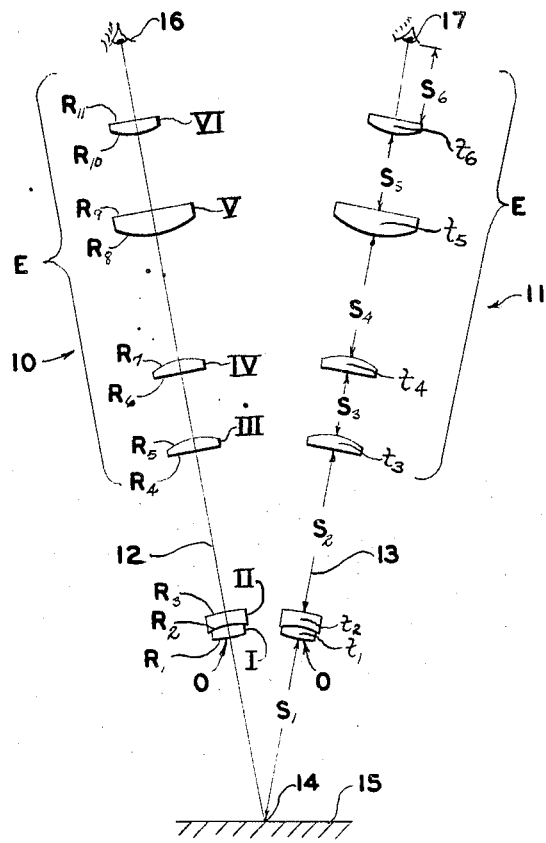

FIG. 1

| MAGNIFICATION = 15× | | NUMERICAL APERTURE = .042 | | | | |
|---|---|---|---|---|---|---|
| LENS | FOCAL LGTH. | RADII | THICKNESS | SPACES | $n_D$ | $v$ |
| I | $F_I = 14.827$ | $R_1 = 31.333$ / $-R_2 = 9.8175$ | $t_1 = 3.0$ | $S_1 = 68.1$ | 1.517 | 64.5 |
| II | $-F_{II} = 28.957$ | $-R_3 = 20.137$ / $R_4 = \infty$ | $t_2 = 2.0$ | $S_2 = 62.46$ | 1.720 | 29.3 |
| III | $F_{III} = 22.115$ | $-R_5 = 11.588$ / $R_6 = \infty$ | $t_3 = 2.0$ | $S_3 = 24.7$ | 1.524 | 59.5 |
| IV | $F_{IV} = 22.115$ | $-R_7 = 11.588$ / $R_8 = 15.849$ | $t_4 = 2.0$ | $S_4 = 47.1$ | 1.524 | 59.5 |
| V | $F_V = 25.522$ | $R_9 = \infty$ | $t_5 = 2.8$ | $S_5 = 29.0$ | 1.621 | 36.2 |
| VI | $F_{VI} = 22.115$ | $R_{10} = 11.588$ / $R_{11} = \infty$ | $t_6 = 2.0$ | $S_6 = 9.9$ | 1.524 | 59.5 |

SCALAR VALUES STATED IN MM.

FIG. 2

INVENTOR.
JAMES R. BENFORD

BY Frank C. Parker

ATTORNEY

United States Patent Office 3,272,070
Patented Sept. 13, 1966

3,272,070
OPTICAL SYSTEM FOR STEREOMICROSCOPE
James R. Benford, Irondequoit, N.Y., assignor to Bausch & Lomb Incorporated, Rochester, N.Y., a corporation of New York
Filed Jan. 18, 1963, Ser. No. 252,459
2 Claims. (Cl. 88—57)

The present invention relates to an optical system for a stereomicroscope and more particularly it relates to improvements in a low cost optical system for such an instrument.

The optimum condition in stereomicroscope optical systems is the exact duplication of the two stereo optical systems which are used to provide stereovision, said systems having the same image magnification and degree of aberration correction. Said condition may be met by the use of expensive and complex optical systems but difficulty is encountered in meeting the condition with low cost optical parts.

It is an object of the present invention to provide a stereopair of optical systems which produce stereo images of the same magnification and general optical characteristics, said systems having a magnification of substantially $15\times$ and a numerical aperture of substantially .042 and being well corrected for all spherical and chromatic aberrations.

Another object is to provide such a device at the least cost consistent with good optical performance by means of simple favorable construction features and procedures.

Further objects and advantages will be apparent in the details of construction, and arrangement and combination of parts by reference to the specification herebelow taken in connection with the accompanying drawing, wherein:

FIG. 1 is an optical diagram showing the present invention; and

FIG. 2 is a chart of constructional data related to a preferred form of said invention.

The aforesaid favorable constructional features and procedures by which the stereooptical systems are produced contemplate primarily the optical design of very simple lens forms and secondarily propose to optically match up stereo sets of the optical parts which are comprised in each optical system so as to achieve as near as possible the aforesaid optimum condition. Since the optical parts are all very simple, these parts may be produced in great numbers economically to provide a stock pile of lenses from which a selection of lenses may be made for the aforesaid stereo sets of optical parts.

According to the present invention, two stereooptical systems 10 and 11 are provided as seen in FIG. 1 having respective optical axes 12 and 13 which are inclined relative to each other and intersect at a point 14 on a specimen surface 15. The optical systems 10 and 11 form stereo images of surface 15 at the respective eyepoints 16 and 16 of the microscope.

With respect to the combination of parts in said optical systems 10 and 11, each system consists of a compound objective lens O which is optically aligned with an erecting type of eyepiece E. In the objective O, the combination more particularly consists of a front double convex lens element I lying in contact on its rear side with a concavo-convex lens element II, and the eyepiece E consists of four air spaced plano-convex singlet lenses which are successively numbered III, IV, V and VI. The plano surfaces of the lenses III and IV face forwardly and the corresponding surfaces of lenses V and VI face rearwardly.

Each of the stereooptical systems 10 and 11 is constructed by the use of optical parameters which provide very good correction of spherical and chromatic aberrations and the residual spherical aberration of the eyepiece E is compensated by a prescribed amount of spherical aberration of opposite sign which is designed into the objective O.

The equalization of the magnification of the stereo images formed by the optical systems 10 and 11 is dependent on the algebraic sum of the focal lengths of the individual lenses I to VI. Since it is not possible to economically manufacture a quantity of any one lens part with exactly the same focal length, a tolerance is established for the focal length of each individual lens lying within the ranges given in the table herebelow. The lenses are all graded according to their precise focal lengths and by a selective procedure, the most favorable focal lengths of the lenses I to VI are combined together to form two stereooptical systems producing the same magnification and state of correction of image aberrations.

The range of values for the aforementioned optical parameters which is found necessary to facilitate the above-described selective procedure is given in the table of mathematical statements herebelow, wherein the successive lenses are designated I to VI, the focal lengths thereof are designated $F_I$ to $F_{VI}$ and the minus (—) sign used therewith signifies negative power, the radii of the successive lens surfaces are designated $R_1$ to $R_{11}$ and the minus (—) sign used therewith applies to all lens surfaces which have their centers of curvature lying on the object side of the vertex of the surface, the successive lens thicknesses being designated $t_1$ to $t_6$, the successive air spaces between said specimen surface and the eyepoint of the microscope being designated $S_1$ to $S_6$ and the refractive index and Abbe number of the successive lens materials being designated $n_D$ and $v$ respectively, $.0939F < F_I < .1147F$
$.202F < -F_{II} < .224F$
$.1544F < F_{III} < .1706F$
$.1544F < F_{IV} < .1706F$
$.1786F < F_V < .1974F$
$.1544F < F_{VI} < .1706F$
$.221F < R_1 < .245F$
$.0687F < -R_2 < .0759F$
$.1408F < -R_3 < .1556F$
$R_4 = \text{Plano}$
$.0814F < -R_5 < .0898F$
$R_6 = \text{Plano}$
$.0814F < -R_7 < .0898F$
$.1115F < R_8 < .1221F$
$R_9 = \text{Plano}$
$.0814F < R_{10} < .0898F$
$R_{11} = \text{Plano}$
$.0213F < t_1 < .0235F$
$.01405F < t_2 < .01551F$
$.01405F < t_3 < .01551F$
$.01405F < t_4 < .01551F$
$.01957F < t_5 < .02161F$
$.01405F < t_6 < .01551F$
$.477F < S_1 < .527F$
$.439F < S_2 < .485F$
$.173F < S_3 < .191F$
$.330F < S_4 < .364F$
$.2032F < S_5 < .2244F$
$.0693F < S_6 < .0765F$

| Lens | $n_D$ | $v$ |
|---|---|---|
| I | 1.512 to 1.521 | 60 to 69. |
| II | 1.715 to 1.725 | 25 to 34. |
| III, IV, VI | 1.520 to 1.529 | 55 to 64. |
| V | 1.616 to 1.625 | 31 to 40. |

More specifically, the values for one form of said optical systems may be specified in the table of mathematical statements given herebelow, the designations remaining the same as given hereabove, $F_I = .1093F$
$-F_{II} = .213F$
$F_{III} = .1625F$
$F_{IV} = .1625F$
$F_V = .1880F$
$F_{VI} = .1625F$
$R_1 = .233F$
$-R_2 = .0723F$
$-R_3 = .1482F$
$R_4 = $ Plano
$-R_5 = .0856F$
$R_6 = $ Plano
$-R_7 = .0856F$
$R_8 = .1168F$
$R_9 = $ Plano
$R_{10} = .0814F$
$R_{11} = $ Plano
$t_1 = .0224F$
$t_2 = .01478F$
$t_3 = .01478F$
$t_4 = .01478F$
$t_5 = .02059F$
$t_6 = .01478F$
$S_1 = .502F$
$S_2 = .462F$
$S_3 = .182F$
$S_4 = .347F$
$S_5 = .2138F$
$S_6 = .0729F$ The numerical values for one successful form of said optical systems 10 and 11 are given in the chart of values herebelow wherein the designations remain the same as heretofore.

[Magnification = 15×    Numerical Aperture = .042]

| Lens | Focal Length | Radii | Thicknesses | Spacings | $n_D$ | $\nu$ |
|---|---|---|---|---|---|---|
| I | $F_I = 14.827$ | $R_1 = 31.333$<br>$-R_2 = 9.8175$ | $t_1 = 3.0$ | $S_1 = 68.1$ | 1.517 | 64.5 |
| II | $-F_{II} = 28.957$ | $-R_3 = 20.137$<br>$R_4 = $ Plano | $t_2 = 2.0$ | $S_2 = 62.46$ | 1.720 | 29.3 |
| III | $F_{III} = 22.115$ | $-R_5 = 11.588$<br>$R_6 = $ Plano | $t_3 = 2.0$ | $S_3 = 24.7$ | 1.524 | 59.5 |
| IV | $F_{IV} = 22.115$ | $-R_7 = 11.588$<br>$R_8 = 15.849$ | $t_4 = 2.0$ | $S_4 = 47.1$ | 1.524 | 59.5 |
| V | $F_V = 25.522$ | $R_9 = $ Plano<br>$R_{10} = 11.588$ | $t_5 = 2.8$ | $S_5 = 29.0$ | 1.621 | 36.2 |
| VI | $F_{VI} = 22.115$ | $R_{11} = $ Plano | $t_6 = 2.0$ | $S_6 = 9.9$ | 1.524 | 59.5 |

Scalar values stated in mm.

It will be seen in the foregoing description that there is here provided a pair of optical systems for a stereomicroscope which are inexpensive to manufacture and are characterized by excellent performance in accordance with the objects of this invention, and although only a preferred form of the invention has been shown and described in detail, other forms are possible and changes may be made in the optical parameters of the optical systems within the stated ranges without departing from the scope of the invention as defined in the claims here appended.

I claim:

1. A pair of optical systems focused on an area of a specimen to form stereo images at substantially 15× magnification thereof, each of said systems having the combination of a compound objective lens and an erecting type of eyepiece aligned rearwardly thereof, said eyepiece consisting of four plano-convex singlet lenses optically aligned with said objective lens, the plano surfaces of the foremost two singlets facing forwardly and the plano surfaces of the two rearmost lenses facing rearwardly, the optical parameters of each of said systems being given in the table of mathematical statements herebelow wherein the front and rear elements of the compound objective lens are designated I and II respectively and the successive singlet lenses are numbered III, IV, V and VI, the focal lengths of lens parts I to VI being designated $F_I$ to $F_{VI}$, and the minus (−) sign used with $F_{II}$ denoting negative power, the radii of the successive lens surfaces being designated $R_1$ to $R_{11}$ and the minus (−) sign used, therewith denoting those surfaces which have a center of curvature lying on the object side of the vertex of the surface, the axial thicknesses of the successive lenses being designated $t_1$ to $t_6$, the successive air spaces from the specimen to the eyepoint of the instrument being designated $S_1$ to $S_6$, and the refractive index and Abbe number of the glass in the aforesaid lens elements being represented by $n_D$ and $\nu$ respectively, and F is the numerical sum of the focal lengths $F_I$ to $F_{IV}$, $F_I = .1093F$
$-F_{II} = .213F$
$F_{III} = .1625F$
$F_{IV} = .1625F$
$F_V = .1880F$
$F_{VI} = .1625F$
$R_1 = .233F$
$-R_2 = .0723F$
$-R_3 = .1482F$
$R_4 = $ Plano
$-R_5 = .0856F$
$R_6 = $ Plano
$-R_7 = .0856F$
$R_8 = .1168F$
$R_9 = $ Plano
$R_{10} = .0814F$
$R_{11} = $ Plano
$t_1 = .0224F$
$t_2 = .01478F$
$t_3 = .01478F$
$t_4 = .01478F$
$t_5 = .02059F$
$t_6 = .01478F$
$S_1 = .502F$
$S_2 = .462F$
$S_3 = .182F$
$S_4 = .347F$
$S_5 = .2138F$
$S_6 = .0729F$ the refractive index and Abbe number being designated $n_D$ and $\nu$ respectively for the successive lens elements I to VI, the numerical values thereof being given in the table herebelow,

| Lens | $n_D$ | $\nu$ |
|---|---|---|
| I | 1.517 | 64.5 |
| II | 1.720 | 29.3 |
| III | 1.524 | 59.5 |
| IV | 1.524 | 59.5 |
| V | 1.621 | 36.2 |
| VI | 1.524 | 59.5 |

2. A pair of optical systems focused on an area of a specimen to form stereo images at substantially 15× magnification thereof, each of said systems having the combination of a compound objective lens and an erecting type of eyepiece aligned rearwardly thereof, said eyepiece consisting of four plano-convex singlet lenses optically aligned with said objective lens, the plano surfaces of the foremost two singlets facing forwardly and the plano surfaces of the two rearmost lenses facing rearwardly, the optical parameters of each of said systems being given in the table of mathematical statements herebelow wherein the front and rear elements of the compound objective lens are designated I and II respectively and the successive singlet lenses are numbered III, IV, V and VI, the focal lengths of lens parts I to VI being designated $F_I$ to $F_{VI}$, and the minus (−) sign used with $F_{II}$ denoting negative power, the radii of the successive lens surfaces being designated $R_1$ to $R_{11}$ and the minus (−) sign used therewith denoting those surfaces which have a center of curvature lying on the object side of the vertex of the surface, the axial thicknesses of the successive lenses being designated $t_1$ to $t_6$, the successive air spaces from the specimen to the eyepoint of the instrument being designated $S_1$ to $S_6$, and the refractive index and Abbe number of the glass in the aforesaid lens elements being represented by $n_D$ and $\nu$ respectively,

[Magnification=15× Numerical Aperture=.042]

| Lens | Focal Length | Radii | Thicknesses | Spacings | $n_D$ | $\nu$ |
|---|---|---|---|---|---|---|
| I | $F_I = 14.827$ | $R_1 = 31.333$ | $t_1 = 3.0$ | $S_1 = 68.1$ | 1.517 | 64.5 |
|   |   | $-R_2 = 9.8175$ |   |   |   |   |
| II | $-F_{II} = 28.957$ | $-R_3 = 20.137$ | $t_2 = 2.0$ | $S_2 = 62.46$ | 1.720 | 29.3 |
|   |   | $R_4 = $ Plano |   |   |   |   |
| III | $F_{III} = 22.115$ | $-R_5 = 11.588$ | $t_3 = 2.0$ | $S_3 = 24.7$ | 1.524 | 59.5 |
|   |   | $R_6 = $ Plano |   |   |   |   |
| IV | $F_{IV} = 22.115$ | $-R_7 = 11.588$ | $t_4 = 2.0$ | $S_4 = 47.1$ | 1.524 | 59.5 |
|   |   | $R_8 = 15.849$ |   |   |   |   |
| V | $F_V = 25.522$ | $R_9 = $ Plano | $t_5 = 2.8$ | $S_5 = 29.0$ | 1.621 | 36.2 |
|   |   | $R_{10} = 11.588$ |   |   |   |   |
| VI | $F_{VI} = 22.115$ | $R_{11} = $ Plano | $t_6 = 2.0$ | $S_6 = 9.9$ | 1.524 | 59.5 |

Scalar values stated in mm.

References Cited by the Examiner

UNITED STATES PATENTS

| | | | |
|---|---|---|---|
| 1,468,762 | 9/1923 | Taylor et al. | 88—39 X |
| 1,914,212 | 6/1933 | Ott | 88—39 |
| 2,804,802 | 9/1957 | Loeck | 88—57 X |
| 3,152,212 | 10/1964 | Altman et al. | 88—57 |

DAVID H. RUBIN, *Primary Examiner.*

J. G. BOLTEN, *Assistant Examiner.*